UNITED STATES PATENT OFFICE.

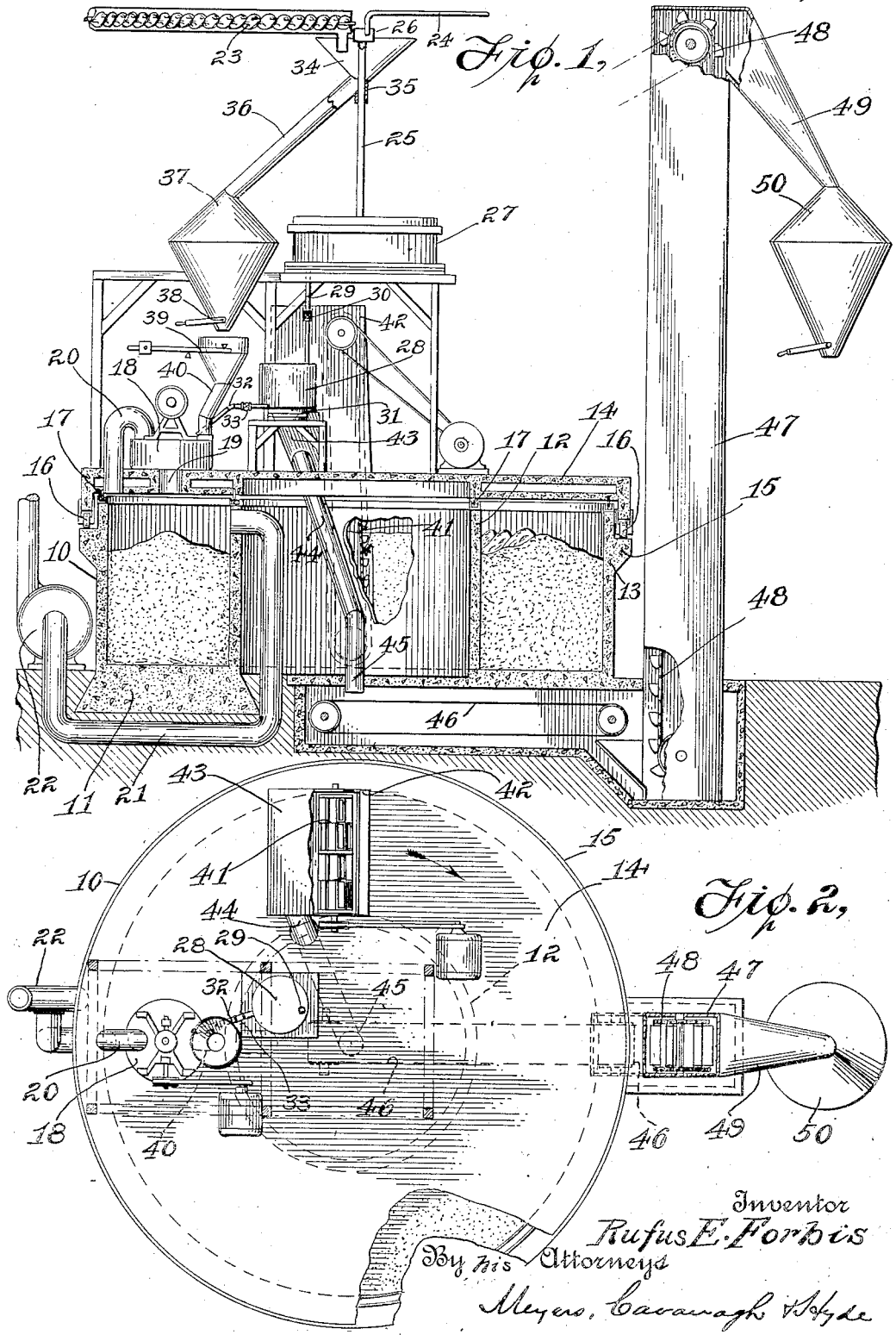

RUFUS E. FORBIS, OF CHARLOTTE, NORTH CAROLINA, ASSIGNOR TO CHEMICAL CONSTRUCTION COMPANY, OF CHARLOTTE, NORTH CAROLINA, A CORPORATION OF NORTH CAROLINA.

ACID-PHOSPHATE APPARATUS.

1,376,612.     Specification of Letters Patent.     Patented May 3, 1921.

Application filed June 14, 1920. Serial No. 388,846.

*To all whom it may concern:*

Be it known that I, RUFUS E. FORBIS, a citizen of the United States, and resident of Charlotte, in the county of Mecklenburg and State of North Carolina, have invented certain new and useful Improvements in Acid-Phosphate Apparatus, of which the following is a specification.

My invention relates to an improved apparatus primarily adapted for the manufacture of acid phosphate, but which may be employed in the production and manipulation of other substances having similar requirements, and is in certain respects an improvement on my prior Patent No. 1,318,063.

Acid phosphate is generally manufactured by mixing ground phosphate rock with sulfuric acid in predetermined proportions, the product taking the form of a heavy hot liquid which sets or hardens gradually, the solidified phosphate being of such consistency that it may be dug out and removed either by shovel and wheelbarrow, as in the earlier method, or by a bucket excavator as in my previous patent. In the construction disclosed by said patent, I provide a revolving annular chamber or den located below a platform carrying the mixer apparatus which delivers the liquid phosphate to the den, and the excavator which removes the phosphate therefrom, so arranged and timed that the phosphate deposit at any particular point thereof will have time to harden before the excavator arrives at that point. This arrangement permits continuous operation of the apparatus, including continuous feeding of the materials and continuous delivery of the product.

I have found that under certain conditions the use of a revolving den presents various difficulties in construction and operation, particularly in plants of large capacity. A main object of my invention is to eliminate these difficulties without interfering with the continuous operation of the plant. I therefore employ a stationary den which may be as strong in construction and foundation as is desired, regardless of the resultant weight and size thereof. In connection therewith I provide means for depositing the material in the den, and for removing it therefrom, which are mounted to travel along the den. For this purpose I preferably provide a platform which may extend across the top of the den, as shown in the form illustrated, which is rotatably mounted and carries suitable depositing and removing means. These preferably are of the general type shown in my said patent, although obviously other forms may be employed; and as the relative movement between the den and the platform, and the arrangement of the apparatus on the platform may be substantially the same as shown in said patent, the same mode of operation is readily carried out, retaining the advantages thereof without the disadvantages attendant upon the use of a revolving den. This arrangement also facilitates the complete sealing of the den and the elimination of the noxious fumes which are produced in the manufacture of acid phosphate, the handling of which constitutes an important problem in providing a commercially practical plant.

A further important object of my invention is to provide stationary means for feeding the material or ingredients thereof to the mixer or other depositing apparatus. In view of the weight and bulk of the material used in plants of this type, the employment of a fixed feeding system is highly important, as it permits rapid and continuous handling of the raw material which would otherwise be impossible. I have also provided an arrangement by which a plurality of ingredients may be supplied simultaneously by a fixed system.

Another object is the provision of means traveling with the depositing and removal apparatus for supplying accurately measured portions of the various ingredients to the mixer. One method of accomplishing this object is disclosed, and includes the provision of storage containers traveling with the mixer, together with means for transferring a measured quantity of the material from each container to the mixer at will.

Another important object is the provision in connection with traveling removal apparatus of a fixed discharge point, from which the material may readily be handled regardless of the position of the removal apparatus in the den. I have shown one way of accomplishing this object, which broadly consists in discharging the material at the center or axis of the den, which will remain the same regardless of the position of the removal apparatus and permits the use of rigid discharge mechanism mounted on the platform.

Moreover, I have also devised an improved arrangement for the removal of fumes not only from the den above the material, but also from the mixer, the latter object being attained by connecting the mixer through the platform with the upper part of the den. The platform arrangement above indicated is particularly convenient for this purpose, as it permits the sealing or luting of the den in an extremely convenient and efficient way.

Other objects and advantages of my invention will be apparent from the following description taken in connection with the accompanying drawings, in which—

Figure 1 is a transverse sectional view, parts being broken away, and

Fig. 2 is a top plan view, parts being broken away to show the platform and the principal apparatus carried thereby.

The den 10 is preferably circular in form, though certain features of my invention may be used with dens of other contours. Since the den is stationary it may be mounted upon a foundation 11 of any desired weight and size, and may have its inner wall 12 and outer wall 13 as heavily and strongly constructed as is necessary or desirable, regardless of the weight or bulk thereof. Upon the den 10 I mount a suitable platform 14 in such a way that it is movable along the den. In the preferred form shown the platform is substantially circular in contour and is mounted directly on the den, as by providing a track 15 on the outer wall 13 and a plurality of wheels or rollers 16 at the edge of the platform 14, though obviously this arrangement may be reversed. A suitable lute 17 may be provided between the upper edge of walls 12 and 13 and the lower face of platform 14, this arrangement completely sealing the den and preventing the escape of any fumes therefrom, without interfering with the travel of platform 14.

A suitable mixer 18 is mounted on platform 14 and provided with a discharge 19 communicating with the den and preferably located above the middle thereof. I have provided means for eliminating the fumes generated in the mixer by providing an outlet pipe 20 extending from the mixer into the upper part of the den 10, and leading the fumes from the mixer into the den. I also provide a suitable exhaust for removing fumes from the den, such as exhaust pipe 21, connected with the suction fan 22.

In order to provide a continuous supply of materials to the mixer 18, I employ a suitable fixed feeding system which, in the manufacture of acid phosphate, preferably consists of a phosphate rock supply pipe 23 and an acid supply pipe 24, both terminating adjacent the axis of the den 10, but preferably substantially above platform 14 to permit gravity feed. The acid pipe 24 discharges into a pipe 25, preferably provided with an enlarged inlet 26 directly below the end of pipe 24, the inlet 26 being preferably of sufficient width so that the end of acid pipe 24 may be offset from the axis of rotation of the platform 14 without interfering with the supply of acid to pipe 25.

In the specific disclosure herein, both the acid and the phosphate rock are fed first to a storage container carried by platform 14, from which measured portions are transferred at will to the mixer 18; but it will be apparent that my invention is not limited to this indirect system of feeding or to any indirect feed, as obviously the supply to mixer 18 may readily be regulated otherwise. In the form disclosed I mount on the platform 14 an acid reservoir 27, into which the pipe 25 discharges. I also provide an acid measuring tank 28, connected to reservoir 27 by pipe 29, provided with a suitable cock 30. The tank 28 is preferably mounted on scales 31 so that the amount of acid introduced into said tank can readily be ascertained. Tank 28 is connected to the mixer 18 by a pipe 32, provided with a cock 33.

I have also shown a suitable storage and measuring system for the phosphate rock mounted on platform 14. This may include a funnel shaped inlet 34, located below the end of rock pipe 23 and sufficiently broad to permit the end of said pipe to be offset from the axis of rotation, thus avoiding interference from the acid system; this arrangement including a tight joint 35, where pipe 25 of the acid system passes through inlet 34.

The latter inlet connects with a chute 36 emptying into a suitable storage hopper 37. By means of a suitable gate 38 any desired amount of dust may be discharged from the hopper onto scales 39, and thence through chute 40 into the mixer 18.

While the above described method of depositing material in the den does not require the use of any specific method for removing the final product, I prefer to employ an endless chain bucket excavator 41 of the type disclosed in my above mentioned patent. The excavator is mounted on platform 14 and the portion thereof above the platform is preferably inclosed in a suitable housing 42, so as to prevent the escape of fumes from the den. In connection with the excavator I prefer to employ discharge means adapted to deliver the material at a fixed point, regardless of the position of the excavator relative to the tank. A simple and efficient construction for this purpose is disclosed, consisting of a hopper 43, into which the material is delivered by the chain bucket system 41, hopper 43 being tapered downwardly and inwardly, and terminating in an inclined chute 44 extending to the axis about which platform 14 revolves, the terminal portion 45 of said chute being located on said axis. I have found it convenient to locate said terminus 45 of the discharge chute on a plane at or below the level of the den bottom, and to provide a transverse conveyer, such as endless belt 46, upon which the material is delivered from chute 44 and then conveyed under the den to a point outside thereof, where it can readily be removed. I have also disclosed one convenient arrangement for removing such material, including an elevator 47 provided with an endless chain bucket conveyer 48, discharging at its upper end into any suitable receiver, such as chute 49, which may be provided with a storage bin 50 at the lower end thereof.

In operating my improved apparatus the ingredients, such as phosphate rock dust and sulfuric acid, when the plant is used for the manufacture of acid phosphate, are fed continuously through pipes 23 and 24 into the storage tank 27 and hopper 37. A suitable amount of acid is introduced into weighing tank 28 by manipulating cock 30, scales 31 permitting accurate measurement. Cock 30 is then closed and cock 33 opened, introducing the acid to tank 28. The rock dust is similarly discharged from hopper 37 by manipulating gate 38, scales 39 registering the amount removed, and the dust is then dropped through chute 40 into the mixer 18. After suitable mixing, the product is released through discharge chute 19 into the den 10, the fumes from the mixing passing through pipe 20 into the upper part of the den and being withdrawn through exhaust pipe 21. During this process the platform 14, and the apparatus thereon, is slowly revolving, any desired means such as that shown in my said patent being employed for moving the platform. Consequently the heavy liquid phosphate or other material delivered through chute 19 piles up, the front of the pile traveling slowly around the den as the platform revolves. The excavator 41 follows mixer 18 around the den at a suitable distance, calculated on the rate of speed of platform 14, and the rate of hardening or maturing of the material under given conditions, so that the excavator will remove only fully matured material. Under ordinary circumstances, in the manufacture of acid phosphate, it has been found suitable to space a mixer and excavator by about three quarters of the distance around the den; but this location may obviously be varied to suit different conditions. The phosphate removed by conveyer 41 drops into hopper 43, passing thence through chute 44 onto the conveyer 46, which carries the finished product to the bottom of elevator 47. It is there taken up by bucket chain 48 and discharged into chute 49, being finally deposited in storage bin 50.

While I have disclosed the preferred form of my invention, it will be readily apparent that many variations in this form can be made within the scope of my invention. For instance, any number of ingredients may be introduced from a fixed delivery system to suitable conveying means traveling with the platform for introducing such ingredients either into a mixer, or directly into the den. Furthermore, while the platform arrangement disclosed is particularly suitable for the manufacture of acid phosphate, and especially for confining the fumes produced therein, my invention is not limited to the manufacture of this specific material; and it will be obvious that my invention is not restricted to a platform covering the entire den and forming a seal therefor. Other changes and variations may also be made within the scope of my invention, as set forth in the claims.

I claim:

1. Den charging and discharging apparatus, including a stationary annular den, means mounted to travel along the den for depositing material therein, and means mounted to travel along the den for elevating material therefrom.

2. Den charging and discharging apparatus, including a stationary annular den, means mounted to travel on the den for depositing material therein, means mounted to travel on the den for removing material therefrom, and means for sealing the den.

3. Den charging and discharging apparatus, including a stationary annular den, a rotatably mounted platform, means mounted on the platform for depositing material in the den, and means also mounted on the platform for removing material from said den.

4. Den charging and discharging apparatus, including a stationary annular den, a rotatably mounted platform, means mounted on the platform for depositing material in the den, means also mounted on the platform for removing material from said den, and means carried by the platform for sealing the den.

5. Den charging and discharging apparatus, including a stationary annular den, a mixer mounted to travel along the den and discharge material therein, and means mounted to travel along the den for removing material therefrom.

6. Den charging and discharging apparatus, including a stationary annular den, means mounted to travel along the den for depositing material therein, and an endless chain excavator mounted to travel along the den for removing material therefrom.

7. Den charging and discharging apparatus, including a stationary annular den, a rotatably mounted platform, a mixer mounted on the platform and adapted to discharge material into and along the den, and an endless chain excavator carried by the platform adapted to travel along the den and remove material therefrom.

8. Den charging and discharging apparatus, including a stationary annular den, a rotatably mounted platform, a mixer mounted on the platform, and adapted to discharge material into and along the den, and endless chain excavator carried by the platform adapted to travel along the den and remove material therefrom, and means carried by the platform for sealing the den.

9. Den charging and discharging apparatus, including a stationary annular den, a platform rotatably mounted on the den, a mixer mounted on the platform, and adapted to discharge material into and along the den, an endless chain excavator carried by the platform adapted to travel along the den and remove material therefrom, and means carried by the platform for sealing the den.

10. Den charging and discharging apparatus, including a stationary annular den, means mounted to travel along the den for depositing material therein, means mounted to travel along the den for removing material therefrom and means for discharging the removed material at a fixed point.

11. Den charging and discharging apparatus, including a stationary annular den, means for depositing material in the den, means for removing said material therefrom, the den and the depositing and removal means being relatively movable to provide continuous operation, and means for discharging the removed material at the axis of the den.

12. Den charging and discharging apparatus, including a stationary annular den, a platform mounted to travel along the den, means carried by the platform for depositing material in the den, means carried by the platform for removing material therefrom, and means for discharging the removed material at the axis of the den.

13. Den charging and discharging apparatus, including a stationary annular den, a platform mounted to travel along the den, means carried by the platform for depositing material in the den, means carried by the platform for removing material therefrom, means for discharging the removed material at the axis of the den, and means for conveying the discharged material to a point outside of the den.

14. Den charging and discharging apparatus, including a stationary annular den, a platform mounted to travel along the den, means carried by the platform for depositing material in the den, means carried by the platform for removing material therefrom, means for discharging the removed material at the axis of the den, means for conveying the discharged material to a point outside of the den, and an elevator located outside of the den and adapted to receive the conveyed material.

15. Den charging and discharging apparatus, including a stationary annular den, means for sealing the den, a mixer for discharging material into the den, means for conveying fumes from the mixer into the den, and means for removing fumes from the den.

16. Den charging and discharging apparatus, including a stationary annular den, means mounted to travel along the den for depositing material therein, and stationary means for supplying material to the traveling depositing means.

17. Den charging and discharging apparatus, including a stationary annular den, a platform mounted to travel along the den, means carried by the platform for depositing material in the den, stationary means for supplying material to the depositing means, and means carried by the platform for removing material from the den.

18. Den charging and discharging apparatus, including a stationary annular den, a mixer mounted to travel along the den and fixed means for supplying a plurality of materials to the traveling mixer.

19. Den charging and discharging apparatus, including a stationary annular den, a mixer mounted to travel along the den, fixed means for supplying a plurality of materials to the traveling mixer, means mounted to travel along the den for removing the material therefrom, and means for discharging the removed material at a fixed point.

20. Den charging and discharging apparatus, including a stationary annular den, a platform mounted to travel along the den, a mixer carried by the platform adapted to deposit mixed material in the den, stationary means for supplying a plurality of ingredients to the traveling mixer, means carried by the platform for removing the material from the den, and means for discharging the removed material at a fixed point.

21. Den charging and discharging apparatus, including a stationary annular den, a platform rotatably mounted on the den, a mixer carried by the platform adapted to deposit mixed material in the den, stationary means for supplying a plurality of ingredients to the traveling mixer, means carried by the platform for removing the material from the den, and means for discharging the removed material at a fixed point.

22. Den charging and discharging apparatus, including a stationary annular den, a platform mounted to travel along the den, a mixer carried by the platform for depositing mixed material in the den, storage means traveling with the platform, means for transferring a predetermined amount of material from said storage means to the mixer, stationary means for supplying material to the storage means, and means carried by the platform for removing material from the den.

Signed at Charlotte, in the county of Mecklenburg and State of North Carolina, this 4th day of June A. D. 1920.

RUFUS E. FORBIS.